G. CHAMBERLIN.
Mole Plow.
No. 107,162. Patented Sept. 6, 1870.
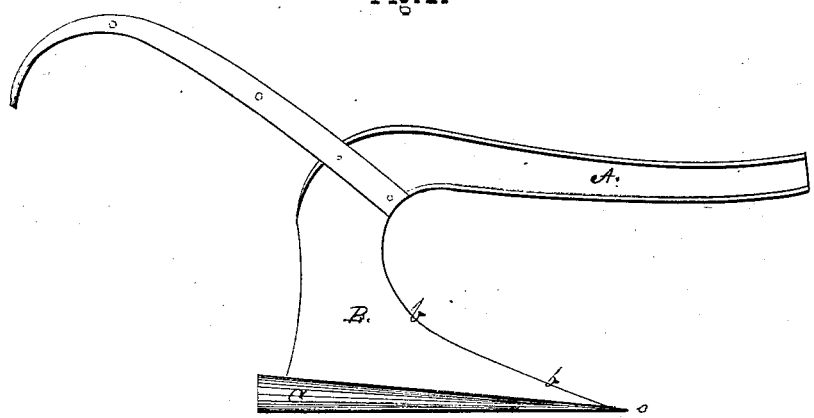
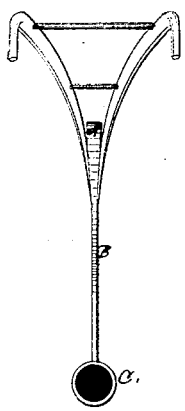 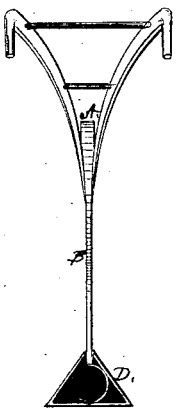 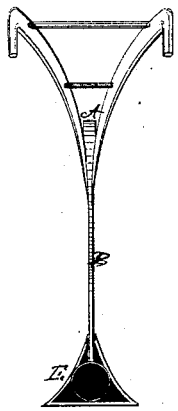

United States Patent Office.

GEORGE CHAMBERLIN, OF OLEAN, NEW YORK.

Letters Patent No. 107,162, dated September 6, 1870.

IMPROVEMENT IN DITCHING-PLOWS.

The Schedule referred to in these Letters Patent and making part of the same

*To all whom it may concern:*

Be it known that I, GEORGE CHAMBERLIN, of Olean, in the county of Cattaraugus and State of New York, have invented certain new and useful Improvements in Ditching-Plows for under-draining meadows and other wet lands, and for other purposes; and the following is a full, clear, and exact description of the same, reference being had to the accompanying drawing making a part of this specification, in which—

Figure 1 represents a side view elevation of my improved implement for making blind ditches or under-drains for meadows, and other wet lands.

Figure 2 shows a rear-end view of the plow for leaving a round under passage for water.

Figure 3 shows the same, with the sheath to enlarge the opening in a triangular form.

Figure 4 shows the same, with another modification of form for under-draining, or loosening the subsoil under the surface.

Sheaths of other forms and sizes may be used, as desired, with or without mold-boards.

The object of my invention is to cut deep blind ditches or under-drains in low lands and wet meadows without removing or throwing up any of the earth on or above the sod or surface of the ground.

My invention consists in the long, sharp pointed, metal cone, as connected with a thin colter or cutting-blade so formed in a draft-beam that it cuts upward thorough the soil and sod, the cone, at the same time, compressing the earth outward underneath, so as to leave a smooth, well-formed pipe or space for a conduit for the water to drain off or run freely in underneath the surface.

To enable others to make and use my improved under-draining plow, I will describe it more fully, referring to the drawing, and to the letters marked thereon.

The beam, A, may be of cast metal, with the colter or cutting-blade, B, cast with it; the sharp, angular curved edge, $b\ b$, may be chilled, so as to make a very sharp and durable cutting-edge.

On the bottom of the colter, and centrally with it, is secured a long, tapering, hollow cone, C, the point $c$ terminating with the sharp point of the cutter $b$, which enters easily into the earth in soft wet soil, and, as it is drawn along, forces the earth outward, compressing it in such a manner as to leave a smooth channel or pipe for the water to run off in, and thus drain the surface.

The implement, as shown in figs. 1 and 2, is designed to form a round opening, which, in most soil, will probably be the best. Cones of various sizes may be placed on over the stationary cone C, so that any sized drain may be made with the implement that may be desired.

A triangular-shaped socket, D, and point may be placed on and over the cone C, as seen in fig. 3, so as to leave the under-drain in that shape. This form may be desirable for making large drains, as it works a little easier than the round cone C.

A socket, E, of the form shown in fig. 4, may be placed at the cone-point C, which will admirably answer the purposes of a subsoil-plow. By running the furrows near together the earth underneath the surface will be cut and loosened in the best manner possible without turning any of the subsoil onto the surface.

Sockets of other forms may be used, as desired, and points with mold-boards on one, both, or either side may be used so as to make a right or left plow to turn over the surface soil, they requiring no other fastening, only to be fitted to the cone-point C, thus making a simple and cheap agricultural implement, that can be readily and easily changed for various uses.

For the purpose of under-draining wet meadows and low lands the above-described plow has been thoroughly and practically tested, and found to be superior to anything that has ever before come to my knowledge.

What I claim as my invention, and desire to secure by Letters Patent, is—

The herein described construction of the beam A, blade B, and cone-point C, the latter being fitted to receive the angular cones D and E, the pieces D and E being removable and interchangable, as and for the purpose specified.

In testimony whereof I hereunto subscribe my name in the presence of—

GEORGE CHAMBERLIN.

Witnesses:
CHAS. H. POOLE,
W. J. KETCHAM.